United States Patent
Ishikawa

(10) Patent No.: US 7,318,355 B2
(45) Date of Patent: Jan. 15, 2008

(54) ULTRASONIC FLOW VELOCITY METER AND ULTRASONIC TRANSDUCER THEREOF

(75) Inventor: Hiroaki Ishikawa, Hamura (JP)

(73) Assignee: Kaijo Sonic Corporation, Hamura, Tokyo (JP)

( * ) Notice: Subject to any disclaimer, the term of this patent is extended or adjusted under 35 U.S.C. 154(b) by 20 days.

(21) Appl. No.: 11/361,636

(22) Filed: Feb. 24, 2006

(65) Prior Publication Data

US 2006/0174717 A1 Aug. 10, 2006

(51) Int. Cl.
*G01F 1/66* (2006.01)

(52) U.S. Cl. .................................... 73/861.25

(58) Field of Classification Search ............... None
See application file for complete search history.

(56) References Cited

U.S. PATENT DOCUMENTS

| | | | | |
|---|---|---|---|---|
| 4,545,244 A | * | 10/1985 | Yasuda et al. | 73/861.28 |
| 4,930,358 A | * | 6/1990 | Motegi et al. | 73/861.28 |
| 4,993,418 A | * | 2/1991 | Weaver et al. | 73/861.25 |
| 5,363,848 A | * | 11/1994 | Spani et al. | 73/861.25 |
| 6,067,861 A | * | 5/2000 | Shekarriz et al. | 73/861.25 |
| 6,532,827 B1 | * | 3/2003 | Ohnishi | 73/861.27 |
| 6,615,674 B2 | * | 9/2003 | Ohnishi | 73/861.27 |
| 6,634,239 B2 | * | 10/2003 | Gomm et al. | 73/861.27 |

FOREIGN PATENT DOCUMENTS

| | | |
|---|---|---|
| JP | 60-262015 A | 12/1985 |
| JP | 11-137554 A | 5/1999 |
| JP | 2002-143161 A | 5/2002 |
| JP | 2002-143162 A | 5/2002 |
| WO | WO 2005/083370 A1 | 9/2005 |
| WO | WO 2005/083371 A1 | 9/2005 |
| WO | WO 2005/083372 A1 | 9/2005 |

* cited by examiner

*Primary Examiner*—Harshad Patel
(74) *Attorney, Agent, or Firm*—Frishauf, Holtz, Goodman & Chick, P.C.

(57) ABSTRACT

The invention provides an ultrasonic flow velocity meter that can measure the flow velocity of a fluid over a wide range of degree of contamination with high degree of accuracy. The ultrasonic flow velocity meter includes a mounting base to be fixed to the outside of a conduit line in which the fluid to be measured flows, the mounting base having a mounting surface formed obliquely with respect to a longitudinal axis of the conduit line, a sending transducer fixed to the mounting base for emitting an ultrasonic wave to the interior of the fluid, a receiving transducer fixed to the mounting base and receiving the reflected ultrasonic wave having subjected to Doppler shift and emitted from the interior of the fluid, and a calculating unit for calculating the flow velocity of the fluid from the amount of the Doppler shift of the reflected wave received by the receiving transducer. The sending transducer and the receiving transducer are being arranged so that an axis of sending and an axis of reception are coincided with respect to each other, continuously send the ultrasonic wave and continuously receive the ultrasonic wave, respectively.

3 Claims, 10 Drawing Sheets

ULTRASONIC FLOW VELOCITY METER AND ULTRASONIC TRANSDUCER THEREOF

BACKGROUND OF THE INVENTION

1. Field of the Invention

The present invention relates to an ultrasonic flow velocity meter for measuring a flow velocity and a flow rate of a fluid and, more specifically, to an ultrasonic flow velocity meter and an ultrasonic transducer thereof in which Doppler shift and the difference of propagation time are utilized. Since measurement of the flow rate is possible by multiplying the flow velocity measured by the ultrasonic flow velocity meter by a cross-sectional area of a flow path, the ultrasonic flow velocity meter includes a concept of an ultrasonic flow rate meter.

2. Description of the Related Art

In the related art, an ultrasonic flow velocity meter has been used as a device for measuring the flow velocity and flow rate of a fluid. The ultrasonic flow velocity meter includes a pair of ultrasonic transducers opposed to each other and arranged along a conduit line at a distance from each other, and emits ultrasonic waves from one of the pair of ultrasonic transducers into the fluid flowing in the conduit line and causing the other transducer to receive the ultrasonic waves propagated in the fluid. Then, the flow velocity of the fluid is obtained from the difference between the amount of time that the ultrasonic wave is propagated upstream and the amount of time that the ultrasonic wave is propagated downstream, and the flow rate is measured by multiplying the flow velocity by the cross-sectional area of the flow path.

In the ultrasonic sensor of a time of flight system on the basis of the amount of time required for propagation described above, if the fluid to be measured contains a large amount of particles such as air bubbles or contaminants, there arises a problem for measurement such that the ultrasonic wave emitted in the fluid may be reflected or dispersed by such particles and hence a level of receiving the transmitted component is lowered. For such a reflective fluid, Doppler system utilizing Doppler shift is suitable. Doppler system is a method receiving an ultrasonic wave reflected in the fluid and detecting the amount of Doppler shift occurred in frequency thereof so that the velocity of reflective substances that caused reflection, such as particles, that is, the flow velocity of the fluid is measured. The known flow velocity meter used in Doppler system includes the one for industrial use (JP-A-60-262015) or the one for medical use that measures the blood flow velocity (JP-A-11-137554, JP-A-2002-143161, JP-A-2002-143162).

The flow velocity meter of Doppler system includes Pulse Doppler system in which an ultrasonic wave is emitted in pulses (WO2005/083372) and Continuous Wave Doppler system in which the ultrasonic waves are continuously emitted. Pulse Doppler system has a high spatial resolution and hence has an advantage such that a distribution of flow velocity of a fluid can be obtained. In contrast, since Pulse Doppler system is based on a principle such that the flow velocity is detected from extremely short signal, it has a disadvantage such that an SN ratio is low, and hence it is necessary to average measurement values obtained through repetition of a number of times of measurement. On the other hand, Continuous Wave Doppler system has an advantage such that information on an entire irradiated range can be obtained at once and has a disadvantage such that the high spatial resolution cannot be achieved. The both methods have advantages and disadvantages.

FIG. 9 shows an example of arrangement of an ultrasonic transducer of an ultrasonic flow velocity meter of Doppler system. In other words, the ultrasonic flow velocity meter 101 in the related art shown in FIG. 9 is configured in such a manner that a sending transducer 102a and a receiving transducer 103a are mounted to both sides of a conduit line 111 on the outside thereof via substantially triangular mounting bases 102, 103 in an opposed state, so that an axis of sending of the ultrasonic wave of the sending transducer 102a intersects with an axis of reception of the ultrasonic wave of the receiving transducer 103a at a center portion of the conduit line 111. An ultrasonic wave emitted from the sending transducer 102a passes through the mounting base 102 and a wall of the conduit line 111 and is emitted in the fluid, and then is reflected by air bubbles or particles S in the fluid. Part of the reflected wave passes through the wall of the conduit line 111 and the mounting base 103, and then is received by the receiving transducer 103a.

FIG. 10 is a cross-sectional view of another example of the arrangement of the ultrasonic transducer of the ultrasonic flow velocity meter of Doppler system. An ultrasonic flow velocity meter 106 shown in FIG. 10 is configured in such a manner that a sending transducer 107a and a receiving transducer 108a are mounted to one side of the conduit line 111 on the outside thereof in adjacent to each other via substantially triangular mounting bases 107, 108, so that an axis of sending of the ultrasonic wave of the sending transducer 107a and an axis of reception of the ultrasonic wave of the receiving transducer 108a extend in parallel with each other. The ultrasonic wave emitted from the sending transducer 107a passes through the mounting base 107 and the wall of the conduit line 111 and is emitted in the fluid, and then is reflected by the air bubbles or the particles S in the fluid. Part of the reflected wave passes through the wall of the conduit line 111 and the mounting base 108, and then is received by the receiving transducer 108a.

The ultrasonic flow velocity meter 101 of Doppler system shown in FIG. 9 has an advantage such that it is apparent that the flow velocity at the center portion of the flow path is measured, since the axis of sending and the axis of reception of the ultrasonic waves intersects at the center portion of the flow path. In addition, since the propagation route of the ultrasonic wave is apparent, calculation is facilitated and the accuracy is improved. However, in this arrangement, since a long propagation route of the ultrasonic wave that transverses the flow path is formed, the amount of attenuation of propagation due to reflection or dispersion of the ultrasonic wave caused by the air bubbles or the particles increases. Therefore, it has a disadvantage such that if the degree of contamination of the fluid increases, the signal level of the signal received by the receiving transducer 103a and the SN ratio (signal/noise ratio) are lowered, and hence there arise disadvantages such that the accuracy of measurement is lowered, or measurement is impossible for a highly contaminated fluid.

The ultrasonic flow velocity meter shown in FIG. 10 has an advantage such that it can be applied to measurement of the highly contaminated fluid since the propagation route of the ultrasonic wave formed in the fluid is short. However, since the axis of sending and the axis of reception of the ultrasonic wave do not intersect with each other, the area from which the wave is reflected is not clear, and hence the accuracy is deteriorated. Since the original area of the reflected wave is not clear, it is difficult to estimate the flow rate from the result of measurement of the flow velocity and calculation is complicated.

The ultrasonic flow velocity meter in conjunction with FIG. 9 and FIG. 10 also has a disadvantage such that when the degree of contamination of the fluid to be measured is changed, the arrangement of the sending transducer and the receiving transducer must be changed in order to achieve measurement suitable for the degree of contamination. The both ultrasonic flow velocity meters have a common disadvantage such that the level of reception of the reflected wave is low in the case of a clear fluid in which the density of the air bubbles or particles that generate the reflected waves is low, so that measurement is disabled. In the configurations of the ultrasonic flow velocity meters shown in FIG. 9 and FIG. 10, the entry angle of the ultrasonic wave from the sending transducer into the fluid must be coincided with that of the receiving transducer for calculation. Therefore, there may be a case in which these entry angles are physically shifted, and hence the measurement accuracy is deteriorated. In the configurations of the both ultrasonic flow velocity meters shown in FIG. 9 and FIG. 10, the transmitted signal and the reflected signal (received signal) are mixed in a Doppler shift detection circuit for calculating the flow velocity of the fluid. Since the transmitted signal and the received signal are mixed to derive a signal of torsional component (the difference frequency component) (heterodyne method) for calculating the flow velocity, a circuit for mixing the signal is required.

SUMMARY OF THE INVENTION

In order to solve the problems in the above-described related art, an ultrasonic flow velocity meter and an ultrasonic transducer thereof according to the invention includes a receiving transducer and a sending transducer arranged so that an axis of sending coincides with an axis of reception thereof.

Since the axis of sending coincides with the axis of reception in the ultrasonic transducer, the propagation routes of the transmitted ultrasonic wave and the received reflected waves coincide with each other and become distinct. As a consequence, calculation is facilitated, and the accuracy is improved. Even though the degree of contamination is changed, measurement can be performed without changing the arrangement of the transducer.

The axis of sending can be coincided with the axis of reception easily simply by arranging the sending transducer and the receiving transducer one on top of the other in tight contact with each other. Therefore, assembly of the ultrasonic flow velocity meter is achieved easily. Since the sending transducer and the receiving transducer are placed one on top of the other in tight contact with each other, the entry angle of the ultrasonic wave from the sending transducer into the fluid is always coincided with that of the receiving transducer, and these entry angles are prevented from being shifted physically, and hence lowering of the measurement accuracy is prevented.

Since the sending transducer and the receiving transducer are arranged one on top of the other in tight contact with each other, the receiving transducer receives a superimposed signal (superimposed wave) containing the transmitted signal (leakage signal) and the reflected signal (received signal) from moving substances in the fluid. Therefore, the circuit for mixing the signals is not necessary, and hence the configuration of the ultrasonic flow velocity meter can be simplified.

In the sending transducer and the receiving transducer placed one on top of the other in tight contact with each other, the surface area of a wave sending surface is larger than the surface area of a wave receiving surface. Therefore, in the sending transducer, the directivity of the emitted ultrasonic wave is narrowed because of the increase in the sending surface and hence the sending transducer can easily aim at the air bubbles or the particles as targets. On the other hand, in the receiving transducer, the directivity is widened because of downsizing of the receiving surface, and hence the reflected wave from the target can easily be received. Consequently, the accuracy of the ultrasonic flow velocity meter is improved.

Since the sending transducer and the receiving transducer are arranged so as to project like a truncated conical shape, both of the transducers are exposed toward the outside. Therefore, adhesion of electrode plate to the both transducers is achieved easily.

Since Continuous Wave Doppler system is employed, it is not necessary to switch between a sending mode and a receiving mode with respect to the ultrasonic transducer as in the case of the pulse system. Therefore, a simple and cost effective flow velocity meter is achieved.

According to a preferred embodiment of the invention, since the transducers of coaxial type are mounted at positions opposing to each other with the intermediary of the conduit line so that the flow velocity of a highly contaminated fluid is measured by Doppler shift frequency system and the flow velocity of a fluid with low contamination is measured by the time of flight system, the flow velocity of all the fluids can be measured irrespective of the degree of contamination.

According to another preferred embodiment of the invention, since a second ultrasonic transducer for measuring the propagation velocity of the ultrasonic wave in the mounting base is provided for measuring the propagation velocity, the propagation velocity of the ultrasonic wave that varies with the temperature can be corrected, and hence measurement with high degree of accuracy is achieved.

DESCRIPTION OF THE PREFERRED EMBODIMENTS

Figure 1:
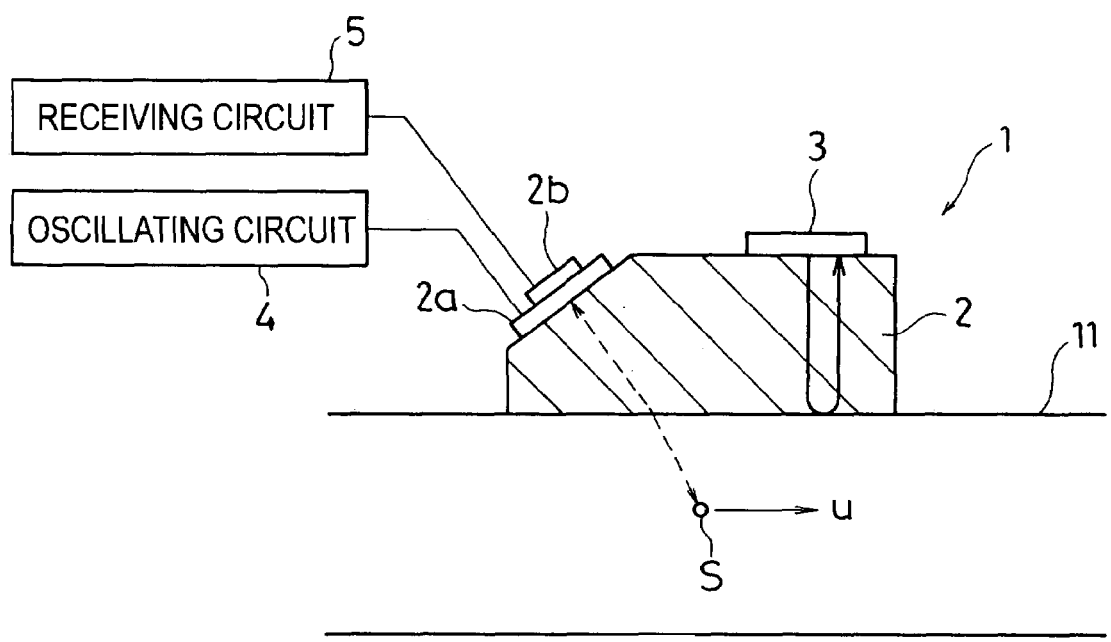
FIG. 1 is a partial cross-sectional view showing a configuration of an ultrasonic transducer that constitutes a hybrid ultrasonic flow velocity meter and a mounting base according to a first embodiment of the invention together with a relation with respect to a conduit line.

FIG. 1 is a partial cross-sectional view showing a configuration of an ultrasonic transducer that constitutes an ultrasonic flow velocity meter and a mounting base according to an embodiment of the invention together with a relation with respect to a conduit line. An ultrasonic flow velocity meter 1 in the first embodiment includes a wedge shaped mounting base 2 formed of resin mounted on the outside of a conduit line 11 in which a fluid to be measured flows. The mounting base 2 is formed with a mounting surface extending obliquely with respect to a longitudinal axis of the conduit line 11, and a circular sending transducer 2a is mounted to the mounting surface. A smaller circular receiving transducer 2b is mounted to an upper surface of the sending transducer 2a.

The sending transducer 2a and the receiving transducer 2b are placed coaxially one on top of the other so that normal lines extending through centers of wave sending surfaces and wave receiving surfaces (axis of sending and axis of reception) are coincided with respect to each other in tight contact manner. The mounting base 2 is also formed with a mounting surface that extends in parallel with the longitudinal axis of the conduit line 11, and a two-way transmission transducer 3 is mounted thereto. The sending transducer 2a and the receiving transducer 2b are placed concentrically. When the surface area of the wave sending surface and the surface area of the wave receiving surface are compared, the surface area of the wave sending surface is larger, and hence these transducers assumes a truncated conical shape. Therefore, the both transducers are exposed toward the outside. The sending transducer 2a and the receiving transducer 2b are tightly adhered with, for example, conductive adhesive agent.

The sending transducer 2a is excited by an alternative current signal of a frequency of 1 MHz supplied from an oscillating circuit 4 and emits a continuous ultrasonic wave. The ultrasonic wave of a frequency of 1 MHz emitted from the sending transducer 2a is propagated through the mounting base 2 and a wall of the conduit line 11 into a fluid. Part of the ultrasonic wave propagated in the fluid is reflected by air bubbles or particles S. The reflected wave is propagated in the fluid in the opposite direction, and then passes through the wall of the conduit line 11, the mounting base 2 and the sending transducer 2a and is received by the receiving transducer 2b, and then is supplied to a receiving circuit 5.

Figure 2:
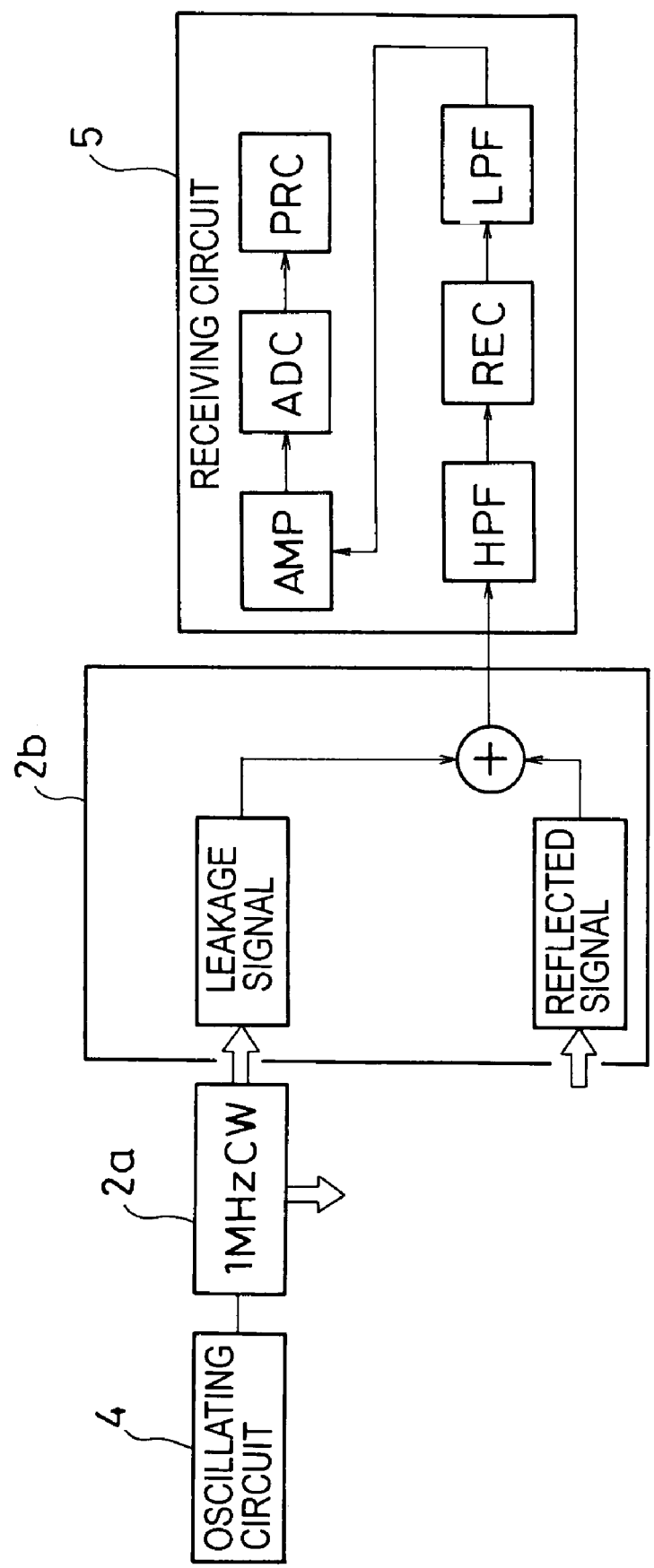
FIG. 2 is a functional block diagram showing a configuration of a receiving circuit for processing an ultrasonic signal received by a receiving ultrasonic transducer.

FIG. 2 is a functional block diagram showing a configuration of the receiving circuit for processing the reflected ultrasonic signal received by the receiving transducer 2b. Since the sending transducer 2a and the receiving transducer 2b are placed one on top of the other in tightly contact with each other, a leakage signal of the continuous ultrasonic wave of 1 MHz received from the sending transducer 2a and the reflected signal reflected in the interior of the fluid and subjected to Doppler shift are superimposed and the signals containing the torsional components are received directly in the receiving transducer 2b.

The signal outputted from the receiving ultrasonic transducer 2b includes a torsional component as follows:

$$A \sin 2\pi f_0 + A \sin 2\pi f_1 = 2A \cos \pi(f_0 - f_1)t \times \sin \pi(f_0 + f_1)t \qquad (1)$$

where: $f_0$ represents the frequency of the leakage signal, $f_1$ represents the frequency of the reflected wave, and A represents amplitude respectively.

A Doppler shift frequency can be obtained from $(f_0 - f_1)$ which is a frequency of the torsional component (difference frequency component).

In other words, the frequency of the torsional component is supplied to a high-pass filter (HPF), where acoustic noises lower than 10 kHz is removed, and is half-wave rectified in a rectification circuit (REC). Then, a carrier frequency component higher than, for example, 20 kHz is removed by the low-pass filter (LPF), whereby a low frequency component (Doppler component) is extracted. The low frequency component is amplified by an amplifier circuit (AMP), is converted into a digital signal in an analogue/digital conversion circuit (ADC), and is supplied to a processor (PRC). The processor (PRC) computes an amount of Doppler shift by processing the digital signal, and computes a flow velocity therefrom. Then, by multiplying the computed flow velocity by a cross-sectional area of the flow path A and a correction coefficient k, a flow rate Q is computed.

Figure 3:
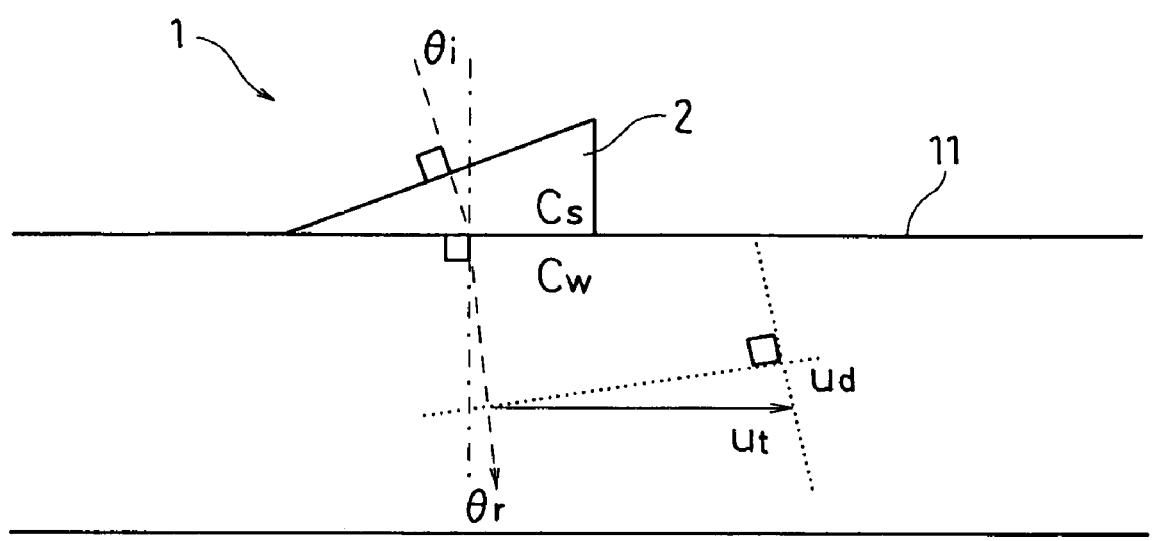
FIG. 3 is a conceptual drawing for explaining a principle of computation of the flow velocity by a processor in FIG. 1.

FIG. 3 is a conceptual drawing for explaining a principle of computation of the flow velocity by the processor. An expression:

$$f_d = f_t(2U_d/C_w) \qquad (2)$$

is established, where: $C_w$ represents the propagation velocity of the ultrasonic wave in the fluid, $C_s$ represents the propagation velocity of the ultrasonic wave in the mounting base, $\theta_i$ represents an entry angle into the fluid, $\theta_r$ represents a refractive angle, $f_t$ represents the sending frequency of the ultrasonic wave, $f_d$ represents the Doppler shift frequency due to the particles, and $U_d$ represents a refractive angle component of the flow velocity of the fluid.

From the geometric relation shown in FIG. 3, a component $U_t$ of the flow velocity of the fluid in the direction of main stream (the direction of the longitudinal axis of the conduit line) can be expressed by:

$$U_t = f_d C_w/(2f_t \sin \theta_r) \qquad (3)$$

Since the ratio between the refractive angle and the velocity of the ultrasonic wave in the liquid is equal to the ratio between the entry angle and the propagation velocity of the ultrasonic wave in the interior of the mounting base, the following expression is established.

$$C_w/\sin \theta_r = C_s/\sin \theta_i \qquad (4)$$

Therefore, the expression:

$$U_t = f_d C_s/(2f_t \sin \theta_i) \qquad (5)$$

is established, and the flow velocity of the fluid can be computed without considering the propagation velocity of the ultrasonic wave in the fluid. This is one of the methods of measuring the flow velocity of the Doppler shift system. Since the coaxial system in which the axis of sending and the axis of reception are coincided is employed in the invention, θ_i in the expression (5) is fixed to one type, and hence the calculation is facilitated, and the accuracy of computation is improved.

As is clear from the expression (5), the flow velocity $U_t$ of the fluid as a result of computation includes the propagation velocity $C_s$ of the ultrasonic wave in the interior of the mounting base 2 in a form of proportionment. In other words, an error contained in the propagation velocity $C_s$ of the ultrasonic wave corresponds to the error of the measurement result as is. Therefore, how accurate the propagation velocity $C_s$ of the ultrasonic wave is detected is a key point of improvement of the measurement accuracy. The propagation velocity in the interior of the mounting base formed of resin varies with the temperature. Therefore, a method of measuring the propagation velocity at a reference temperature, detecting a temperature difference from the reference temperature by a temperature sensor installed on the mounting base, and correcting the propagation velocity of the ultrasonic wave using the temperature difference may also be employed.

However, in the first embodiment, the mounting base 2 is formed with the mounting surface which extends in parallel with the longitudinal axis of the conduit line, and the two-way transmission transducer 3 is mounted to the mounting surface. A pulsed ultrasonic wave transmitted from the two-way transmission transducer 3 is propagated in the interior of the mounting base 2, is reflected by the wall of the conduit line 11, is propagated back in the interior of the mounting base 2 in the opposite direction, and is received by the two-way transmission transducer 3. The propagation velocity $C_s$ of the ultrasonic wave in the interior of the mounting base 2 is detected from the time required from the sending to the reception of the reflected wave and is assigned to the variable in the expression (5).

According to the result of experiment conducted by the inventors, the propagation velocities were 2500 meter per second and 2331 meters per second when the temperature of the mounting base 2 was 26.5° C. and 42.3° C., respectively. In this manner, the propagation velocity $C_s$ of the ultrasonic wave in the interior of the mounting base 2 was actually measured and the actual measurement was assigned to the variable in the expression (5). When such a method was employed, the errors of 0.4% each per amount of temperature change 1° C. to be included in the measurement result when it is not employed were completely eliminated.

Figure 4:
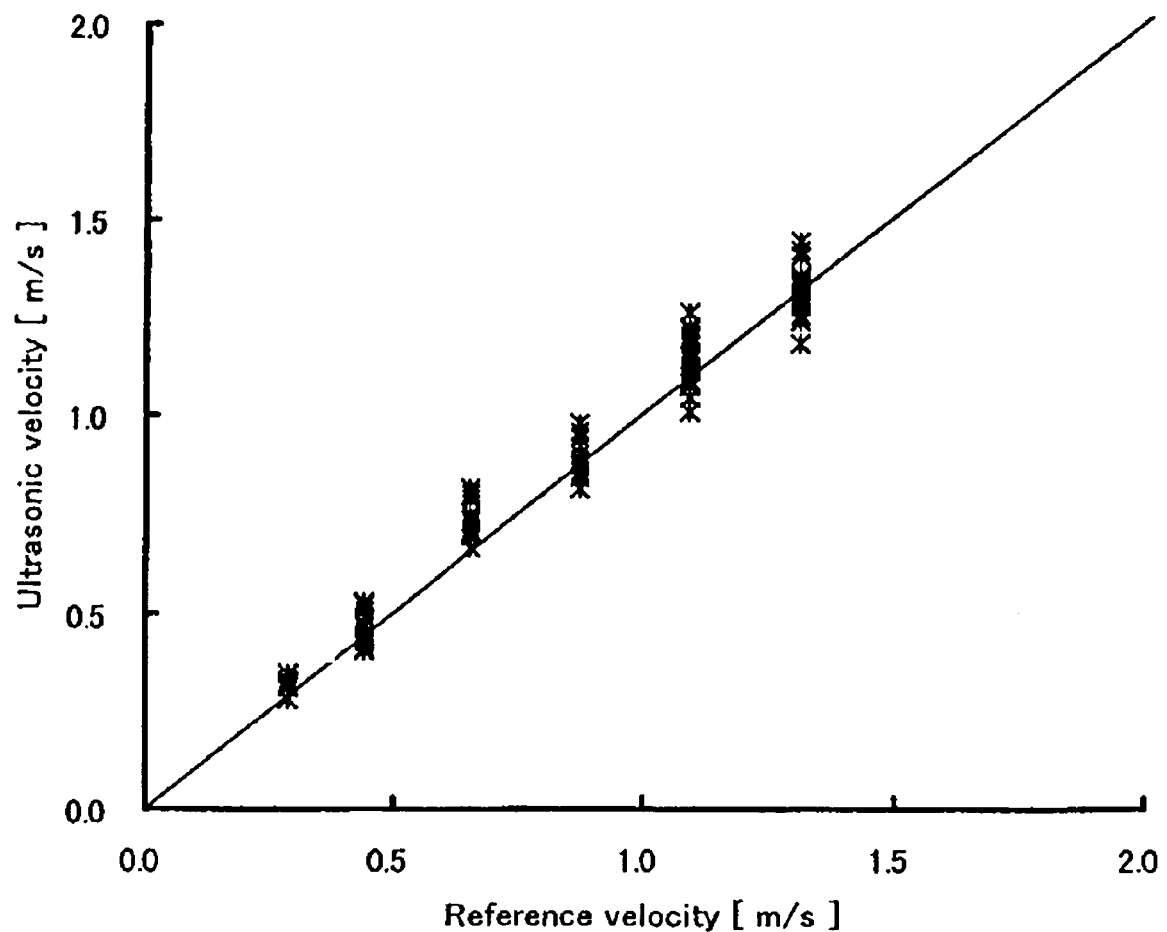
FIG. 4 is a graph of experimental data showing actual measurements obtained by the flow velocity meter according to the first embodiment.
Figure 5:
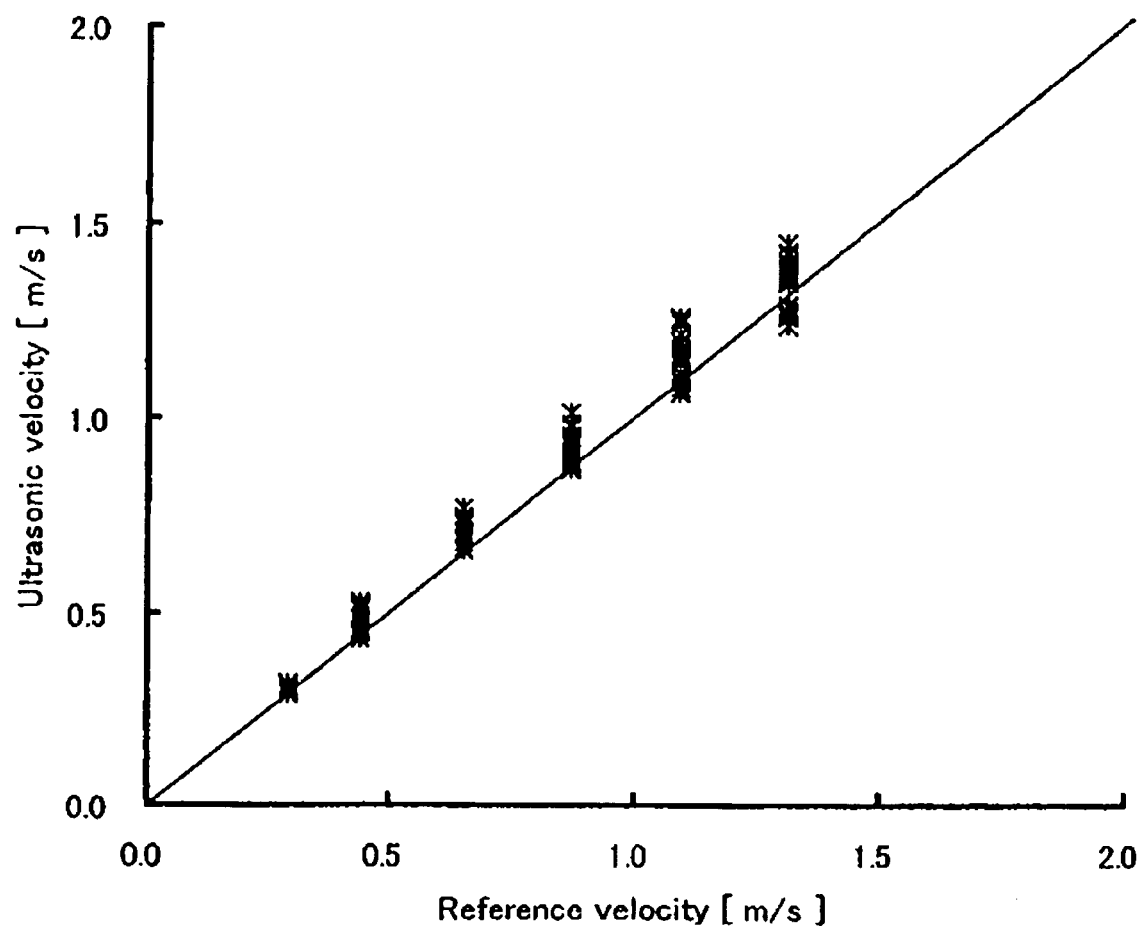
FIG. 5 is a graph of experimental data showing actual measurements obtained by a flow velocity meter of a configuration shown in FIG. 8.
Figure 6:
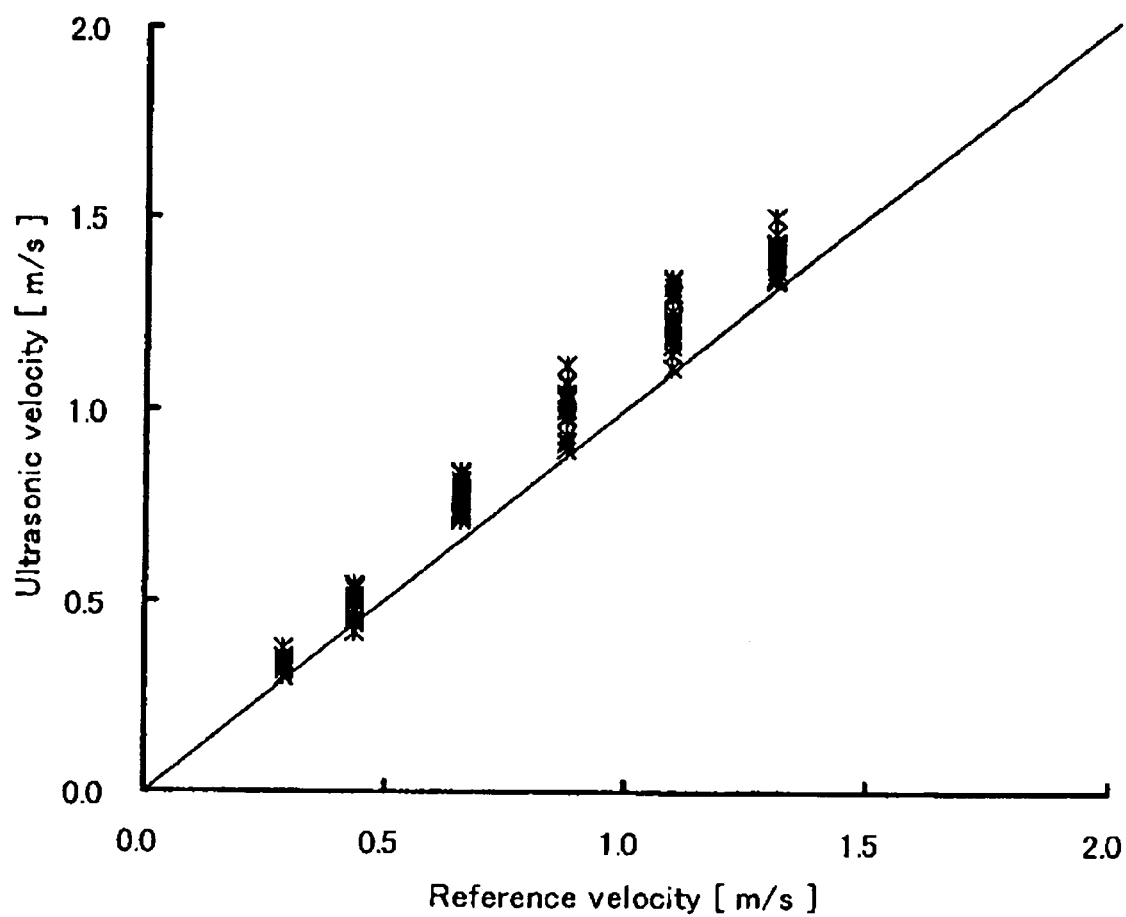
FIG. 6 is a graph of experimental data showing actual measurements obtained by a flow velocity meter of a configuration shown in FIG. 9.
Figure 9:
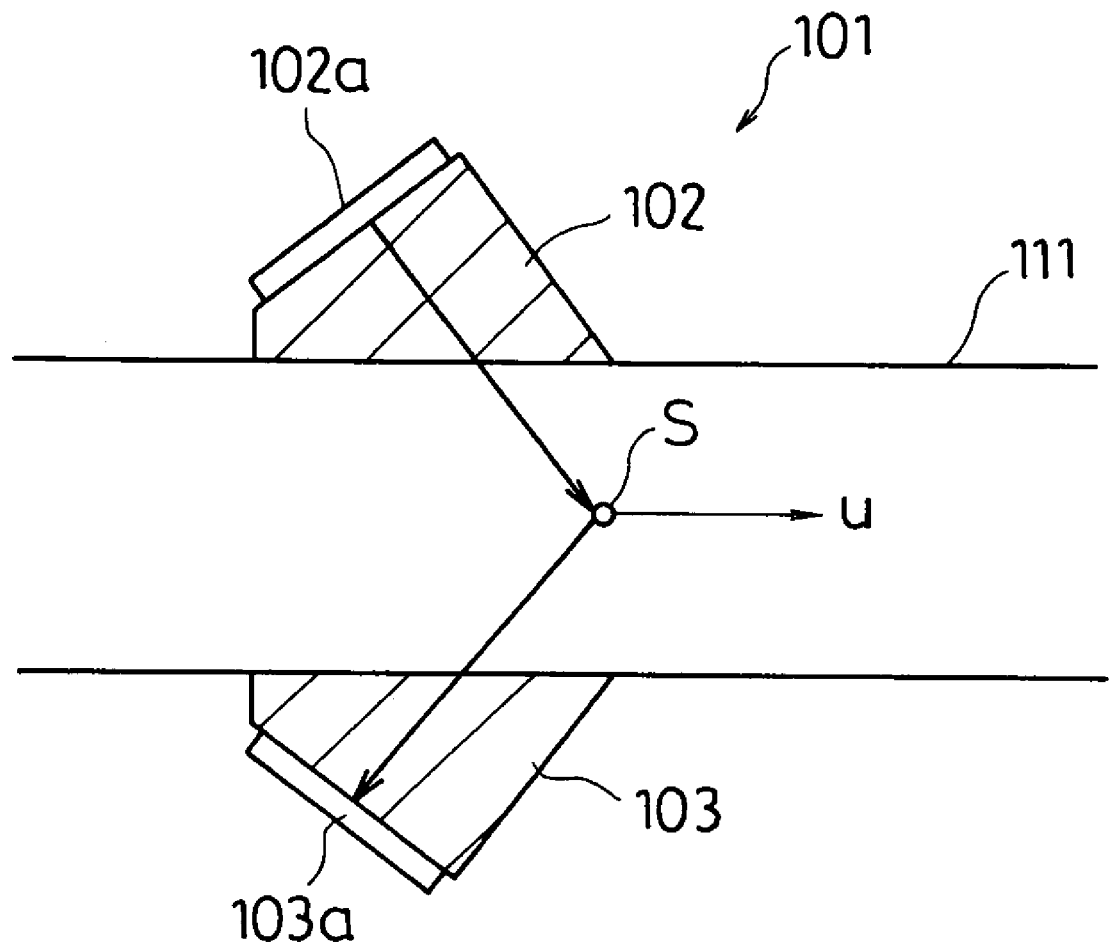
FIG. 9 is a partial cross-sectional view showing an example of a configuration of an ultrasonic transducer that constitutes a Doppler ultrasonic flow velocity meter and the mounting base in the related art together with a relation with respect to the conduit line.
Figure 10:
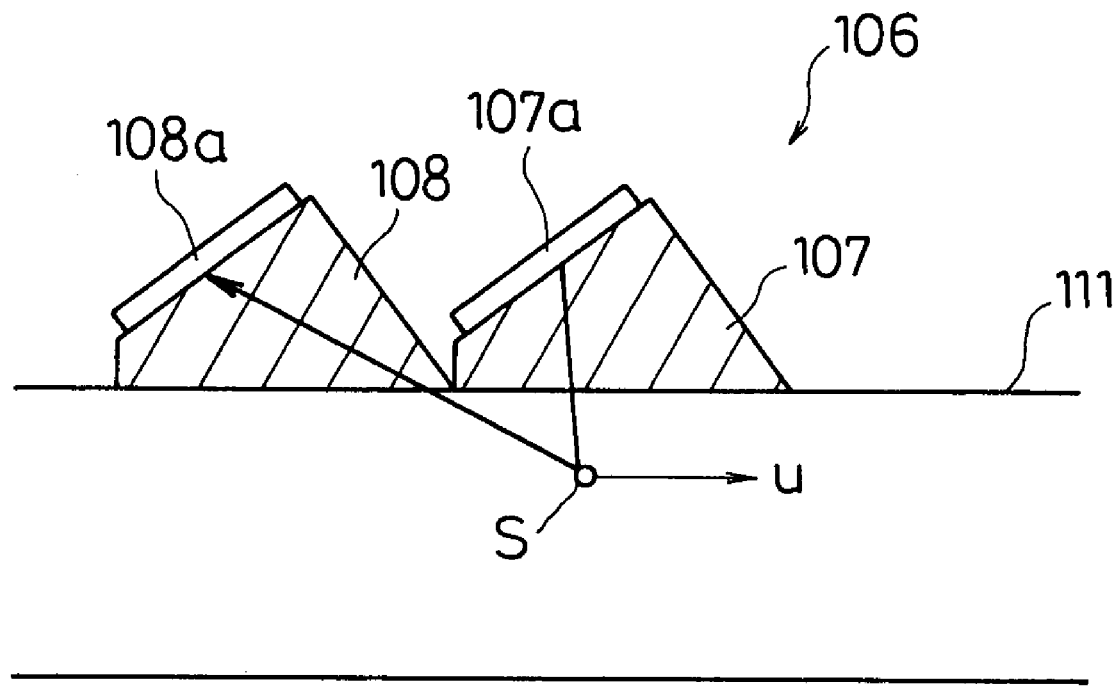
FIG. 10 is a partial cross-sectional view showing another example of the structure of the ultrasonic transducer that constitutes the Doppler ultrasonic flow velocity meter and the mounting base in the related art together with the relation with respect to the conduit line.

FIG. 4 to FIG. 6 show experimental data obtained by the flow velocity meter in the embodiment described above, and experimental data obtained by the flow velocity meter in the related art shown in FIG. 9 and FIG. 10. Results of comparison between the actual measurements and the known flow rate generated by using a circulating reference flow rate generating device are shown in the respective drawings. In each drawing, a lateral axis indicates the known reference flow rate and a vertical axis indicates the actual measurement data. As shown in FIG. 4, the experimental data obtained by the device according to the embodiment of the invention described above is well coincided with a logical value shown by a straight line at an angle of 45°. The lowest in accuracy is the experimental result shown in FIG. 6 obtained by the device in which the axis of sending and the axis of reception are shifted (FIG. 10). The experimental result shown in FIG. 5 obtained by the device in which the axis of sending intersects with the axis of reception at a center portion of the conduit line (FIG. 9) is better than that of the device in FIG. 10, but not as good as that of the above-described embodiment.

Figure 7:
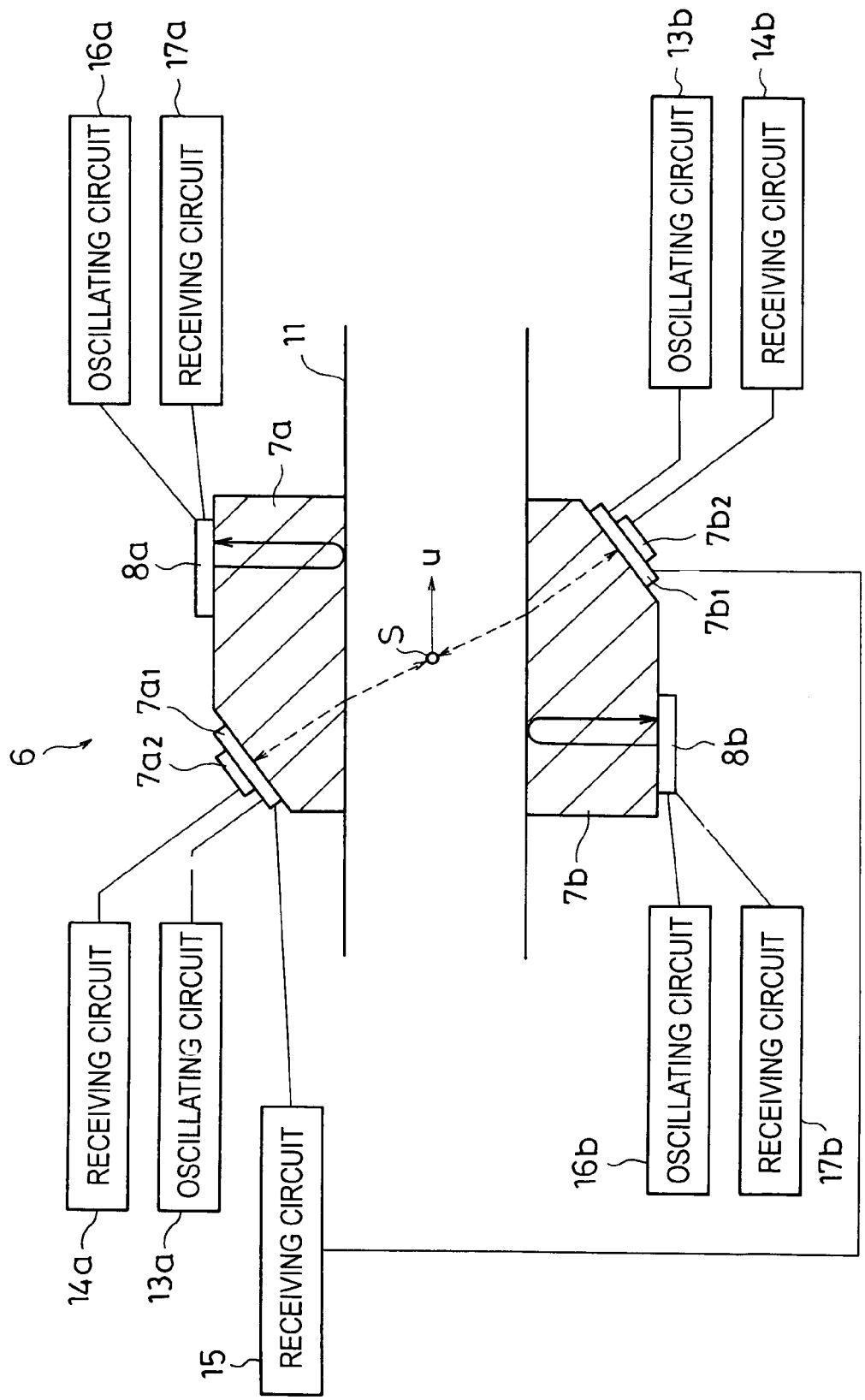
FIG. 7 is a partial cross-sectional view showing a configuration of an ultrasonic transducer that constitutes an ultrasonic flow velocity meter and a mounting base according to a second embodiment of the invention together with a relation with respect to the conduit line.

FIG. 7 is a partial cross sectional drawing showing a configuration of a second embodiment of the invention. The second embodiment relates to an ultrasonic flow velocity meter in which the coaxial transducers are placed at positions opposing to each other with the intermediary of the conduit line so that the flow velocity of the highly contaminated fluid is measured by the Doppler shift frequency system and the flow velocity of the fluid with low contamination is measured by the time of flight system, and the measuring system is switched depending on the degree of contamination, whereby all the fluid irrespective of the degree of contamination can be measured.

The ultrasonic flow velocity meter 6 in the second embodiment includes wedge shaped mounting bases 7a, 7b formed of resin and are mounted at positions opposing to each other with the intermediary of the conduit line 11. The mounting bases 7a, 7b are formed with mounting surfaces extending in parallel with the longitudinal axis of the conduit line 11, and mounting surfaces extending obliquely with respect to the longitudinal axis of the conduit line 11, respectively. The oblique mounting surfaces of the mounting bases 7a, 7b extend in a parallel relation, and oppose to each other with the intermediary of the conduit line 11.

A first two-way transmission transducers 7a1, 7b1 for both sending and reception used for calculating the flow velocity in the Doppler shift frequency system or the time of flight system are mounted on the oblique surface of the mounting bases 7a, 7b which extend obliquely with respect to the longitudinal axis of the conduit line 11 at positions opposing to each other. A smaller circular receiving transducer 7a2 is mounted on the upper surface of the first two-way transmission transducer 7a1 in tight contact thereto. In the same manner, a smaller circular receiving transducer 7b2 is placed on the upper surface of the first two-way transmission transducer 7b1 in tight contact thereto. Oscillating circuits 13a, 13b that supply alternative current signal in any of the Doppler shift frequency system or the time of flight system are connected respectively to the first two-way transmission transducers 7a1, 7b1. A receiving circuit 15 that processes a transmitted signal is connected to the first two-way transmission transducers 7a1, 7b1 in the time of flight system.

A second two-way transmission transducers 8a, 8b for both sending and reception are mounted to the mounting surfaces of the mounting bases 7a, 7b extending in parallel with the longitudinal axis of the conduit line 11 of the mounting bases 7a, 7b for measuring the propagation velocity $C_s$ of the ultrasonic wave in the interiors of the mounting bases 7a, 7b and assigning the actual measurements to $C_s$ in the expression (5). Oscillating circuits 16a, 16b for supplying the alternative current signals to the second two-way transmission transducers 8a, 8b are connected respectively to the second two-way transmission transducers 8a, 8b, and receiving circuits 17a, 17b for calculating the propagation velocity $C_s$ of the ultrasonic wave in the interiors of the mounting bases 7a, 7b from the reflected waves supplied to the second two-way transmission transducers 8a, 8b are respectively connected thereto.

The first two-way transmission transducer 7a1 and the receiving transducer 7a2 are placed coaxially one on top of the other in tight contact with each other so that normal lines extending through centers of wave sending surfaces and wave receiving surfaces (axis of sending and axis of reception) are coincided with respect to each other in tight contact manner, and the first two-way transmission transducer 7b1 and the receiving transducer $7b2$ are also in a relation of being placed one on top of the other in tight contact with each other.

In a state in which the reflected wave of a sufficient level can be obtained because the degree of contamination of the fluid to be measured is high, the first two-way transmission transducers $7a1$, $7b1$ fixed to the respective mounting bases $7a$, $7b$ are used as the sending ultrasonic transducers. The first two-way transmission transducers $7a1$, $7b1$ performs measurement of the flow velocity on the basis of the detection of the Doppler shift frequency exactly in the same manner as the combination of the receiving transducer $7a2$ and the receiving transducer $7b2$ described in FIG. 1. At this time, the propagation velocity of the ultrasonic wave in the interior of the mounting bases $7a$, $7b$ is detected by using the second two-way transmission transducers $8a$, $8b$, the oscillating circuits $16a$, $16b$ and the receiving circuit $17b$, and is assigned to the variable in the expression (5). Measurement of the flow velocity on the basis of the detection of the Doppler shift frequency can be performed not only by calculating an average value using both of the combination of the first two-way transmission transducer $7a1$ and the receiving transducer $7a2$ and the combination of the two-way transmission transducer $7b1$ and the receiving transducer $7b2$ to improve the measurement accuracy, but also by using only measurement values from one of the combinations as a matter of course. In FIG. 7, a configuration in which the second two-way transmission transducers $8a$, $8b$ for detecting the propagation velocity of the ultrasonic wave in the interior of the mounting bases are mounted to both of the mounting bases $7a$, $7b$ is shown. However, it is also possible to eliminate one of them and use the propagation velocity detected by the other second two-way transmission transducer.

In contrast, in a state in which the reflected wave of a sufficient level cannot be obtained because the degree of contamination of the fluid to be measured is too low, measurement of the flow velocity of the time of flight system is performed using the two first two-way transmission transducers $7a1$ and $7b1$ placed at positions opposing to each other with the intermediary of the conduit line 11. In other words, the time until the pulsed ultrasonic wave emitted from the one first two-way transmission transducer $7a1$ is received by the other first two-way transmission transducer $7b1$ and, on the contrary, the time until the pulsed ultrasonic wave emitted from the other first two-way transmission transducer $7b1$ is received by the one first two-way transmission transducer $7a1$ are detected, and the flow velocity of the fluid is measured on the basis of the time difference therebetween.

Subsequently, an operation of the ultrasonic flow velocity meter shown in the second embodiment (FIG. 7) will be described referring to a flowchart shown in FIG. 8. The ultrasonic flow velocity meter 6 includes steps of measuring the flow velocity of the highly contaminated fluid in the Doppler shift frequency system (S2-S5), steps of measuring the flow velocity of the fluid with low contamination in the time of flight system (time difference measurement) (S7-S14), and steps of switching the measuring systems according to the degree of contamination (S6, S15). The respective steps will be described further in detail below.

Figure 8:
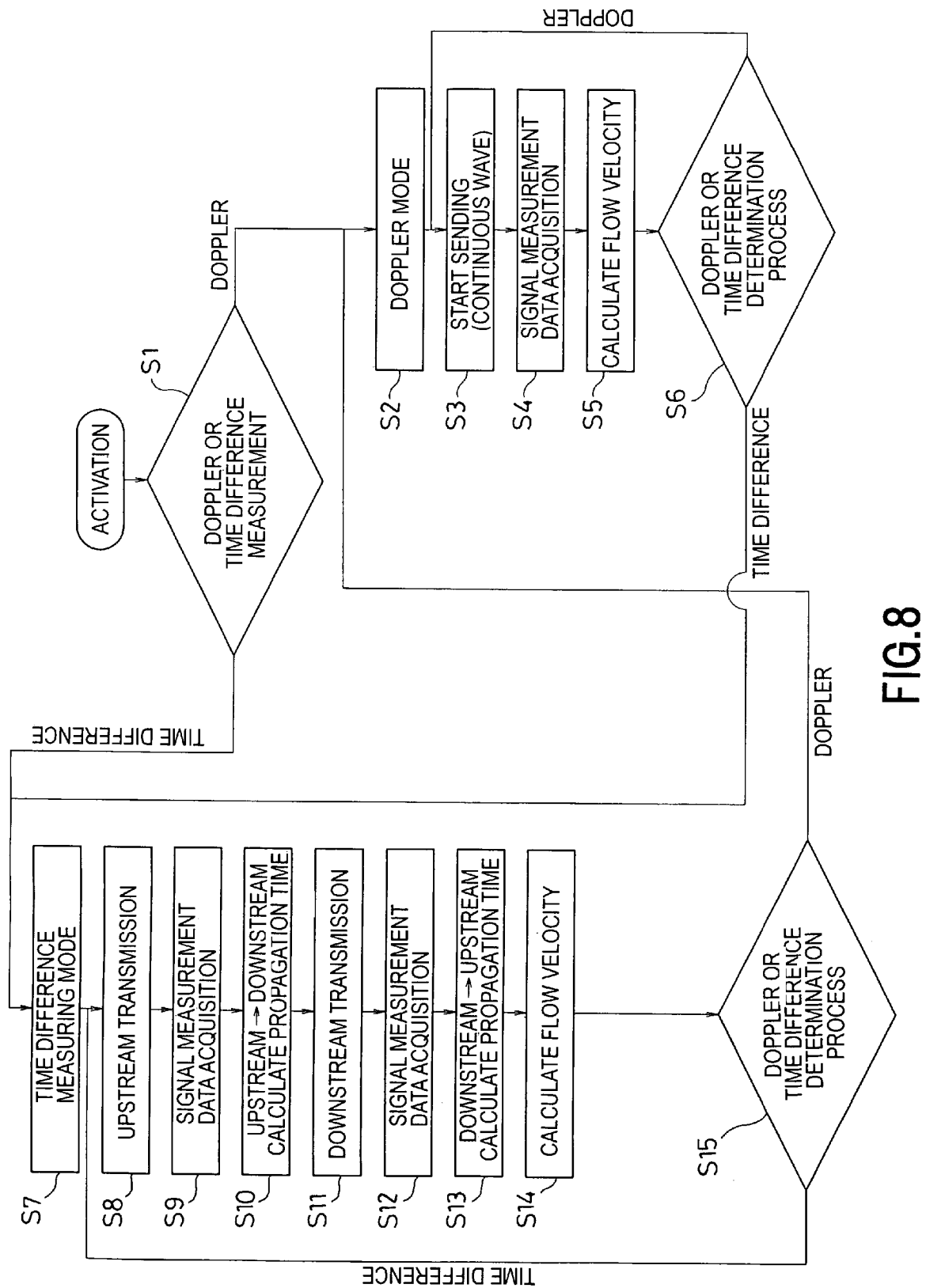
FIG. 8 is a flowchart showing an operation of the ultrasonic flow velocity meter shown in FIG. 7.

As shown in FIG. 8, when the ultrasonic flow velocity meter 6 in the second embodiment is activated, the procedure goes to the respective mode on the basis of the preset mode (the Doppler shift frequency system or the time difference measuring system) according to the type or the state or the like of the fluid to be measured (S1). For example, when the procedure goes to the Doppler mode on the basis of the above-described setting (S2), sending of the continuous ultrasonic waves from the first two-way transmission transducers $7a1$, $7b1$ is started (S3). Then, the emitted ultrasonic waves pass through the mounting bases $7a$, $7b$ respectively and the wall of the conduit line 11 and emitted into the fluid and are reflected by the air bubbles or the particles S in the fluid. Parts of the reflected waves pass through the wall of the conduit line 11 and the mounting bases $7a$, $7b$ respectively, are passed through the first two-way transmission transducers $7a1$, $7b1$, and are superimposed with the leakage signal of the continuous ultrasonic waves of 1 MHz received from the first two-way transmission transducers $7a1$, $7b1$. Then, the signals containing the torsional components are received respectively by the receiving transducers $7a2$, $7b2$, and data is acquired and supplied into the signal measuring and receiving circuits $14a$, $14b$ (S4), whereby the flow velocity is computed by the processor (PRC) in the receiving circuit (S5). When computing the flow velocity in the processor (PRC), the propagation velocities Cs of the ultrasonic wave in the interiors of the mounting bases $7a$, $7b$ which are measured previously or simultaneously in parallel is allocated to $C_s$ in the expression (5), and calculated.

Subsequently, whether the amplitude of the signal acquired in Step S4 is lower than a stipulated voltage or not is determined (S6). If yes, since the reflected wave of a sufficient level can not be obtained because the degree of contamination of the fluid to be measured is too low, the procedure goes to the time difference measuring mode (S7), and sending of the continuous ultrasonic waves from the first two-way transmission transducers $7a1$, $7b1$ is stopped. If it is higher than the stipulated voltage value, the procedure stays in the Doppler mode, and data acquisition into the signal measuring and receiving circuit 5 is continued by the Doppler shift frequency system (S4). Then, the calculation of the flow velocity (S5) and determination of the respective modes (S6) are repeated.

When the procedure goes to the time difference measuring mode (S7), the pulsed ultrasonic wave is sent from the first two-way transmission transducer $7b1$ located upstream (S8). The emitted ultrasonic wave passes through the mounting base $7b$ and the wall of the conduit line 11, is emitted into the fluid, passes through the wall of the conduit line 11 and the mounting base $7a$, and is received by the other first two-way transmission transducer $7a1$ located downstream, where signal measurement and data acquisition are performed (S9). In the receiving circuit 15 for the time difference measurement, the propagating time in the case in which the ultrasonic wave is emitted from upstream to downstream is calculated (S10). Subsequently, the pulsed ultrasonic wave is sent from the first two-way transmission transducer $7a1$ located downstream (S11). The emitted ultrasonic wave passes through the mounting base $7a$ and the wall of the conduit line 11, emitted into the fluid, passes through the wall of the conduit line 11 and the mounting base $7b$, and is received by the other first two-way transmission transducer $7b1$ located upstream, where signal measurement and data acquisition are performed (S12). Then, in the receiving circuit 15 for time difference measurement, the propagating time in the case in which the ultrasonic wave is emitted from downstream to upstream is calculated (S13).

Subsequently, in the receiving circuit 15 for time difference measurement, the flow velocity of the fluid is calculated on the basis of the time difference between the propagating time calculated in S10 for the ultrasonic wave emitted from upstream to downstream and the propagating time calculated in S13 for the ultrasonic wave emitted from downstream to upstream (S14).

Then, whether the range of variation in amplitude of the signals acquired in S9 and S12 are larger than the stipulated voltage value or not is determined (S15). If yes, since the fluid to be measured contains a large amount of air bubbles or particles of contaminants, and hence the receiving level of the transmitted component is not constant because the ultrasonic wave emitted in the fluid is reflected or dispersed due to the particles or the like, measurement cannot be performed correctly. Therefore, the procedure goes to the Doppler mode (S2). When it is lower the stipulated voltage, the procedure stays in the time difference measuring mode, and transmission of the ultrasonic wave and calculation of the propagating time (S8-S13), calculation of the fluid velocity (S14) and the determination of the respective modes (S15) are repeated by the time difference measuring system.

What is claimed is:

1. An ultrasonic flow velocity meter comprising:
   a sending transducer mounted obliquely with respect to a longitudinal axis of a conduit line in which a fluid to be measured flows, the sending transducer emitting an ultrasound wave into an interior of the fluid through the conduit line;
   a receiving transducer for receiving a reflected ultrasonic wave emitted from the interior of the fluid through the conduit line, the reflected ultrasonic wave having been subjected to Doppler shift; and
   a calculating unit for calculating a fluid velocity of the fluid from an amount of the Doppler shift of the reflected ultrasonic wave received by the receiving transducer;
   wherein the sending transducer and the receiving transducer are arranged so that an axis of sending of the sending transducer coincides with an axis of reception of the receiving transducer;
   wherein the sending transducer and the receiving transducer are arranged one on top of the other, a leakage signal of the ultrasonic wave received from the sending transducer and the reflected ultrasonic wave reflected in the interior of the fluid and subjected to the Doppler shift are superimposed in an interior of the receiving transducer, and a signal containing torsional components is directly received by the receiving transducer.

2. An ultrasonic flow velocity meter comprising:
   a sending transducer mounted obliquely with respect to a longitudinal axis of a conduit line in which a fluid to be measured flows, the sending transducer emitting an ultrasound wave into an interior of the fluid through the conduit line;
   a receiving transducer for receiving a reflected ultrasonic wave emitted from the interior of the fluid through the conduit line, the reflected ultrasonic wave having been subjected to Doppler shift; and
   a calculating unit for calculating a fluid velocity of the fluid from an amount of the Doppler shift of the reflected ultrasonic wave received by the receiving transducer;
   wherein the sending transducer and the receiving transducer are arranged so that an axis of sending of the sending transducer coincides with an axis of reception of the receiving transducer;
   wherein the sending transducer and the receiving transducer are arranged one on top of the other;
   wherein the sending transducer is fixed to a mounting surface of a mounting base, which is adapted to be fixed to an outside of the conduit line, and the mounting surface extends obliquely with respect to the longitudinal axis of the conduit line in which the fluid to be measured flows;
   wherein the mounting base comprises another mounting surface that extends in parallel with the longitudinal axis of the conduit line, and the ultrasonic flow velocity meter further comprises:
   a two-way transmission transducer fixed to said another mounting surface for sending a pulsed ultrasonic wave to the conduit line and receiving a reflected wave thereof; and
   a measuring unit for measuring a propagating velocity of the ultrasonic wave within an interior of the mounting base required for calculation in the calculating unit based on a time from sending of the ultrasonic wave from the two-way transmission transducer to reception of the reflected wave thereof.

3. An ultrasonic flow velocity meter, comprising:
   a two-way transmission transducer, mounted obliquely with respect to a longitudinal axis of a conduit line in which a fluid to be measured flows, for emitting an ultrasonic wave into an interior of the fluid through the conduit line and receiving the same;
   a receiving transducer for receiving a reflected ultrasonic wave emitted from the interior of the fluid through the conduit line, the reflected ultrasonic wave having been subjected to Doppler shift; and
   a calculating unit for calculating a flow velocity of the fluid based on an amount of Doppler shift of the reflected ultrasonic wave received by the receiving transducer;
   wherein the two-way transmission transducer and the receiving transducer are arranged so that axis of sending of the two-way transmission transducer coincides with an axis of reception of the receiving transducer;
   wherein the two-way transmission transducer and the receiving transducer are arranged one on top of the other;
   wherein the two-way transmission transducer is fixed to a mounting surface of a mounting base, which is adapted to be fixed to an outside of the conduit line, and the mounting surface extends obliquely with respect to the longitudinal axis of the conduit line in which the fluid to be measured flows;
   wherein the mounting base comprises another mounting surface that extends in parallel with the longitudinal axis of the conduit line, and the ultrasonic flow velocity meter further comprises:
   a second two-way transmission transducer fixed to said another mounting surface for sending a pulsed ultrasonic wave to the conduit line and receiving a reflected wave thereof; and
   a measuring unit for measuring a propagating velocity of the ultrasonic wave within an interior of the mounting base required for calculation in the calculating unit based on a time from sending of the ultrasonic wave from the second two-way transmission transducer to reception of the reflected wave thereof.

* * * * *